Patented Apr. 30, 1946

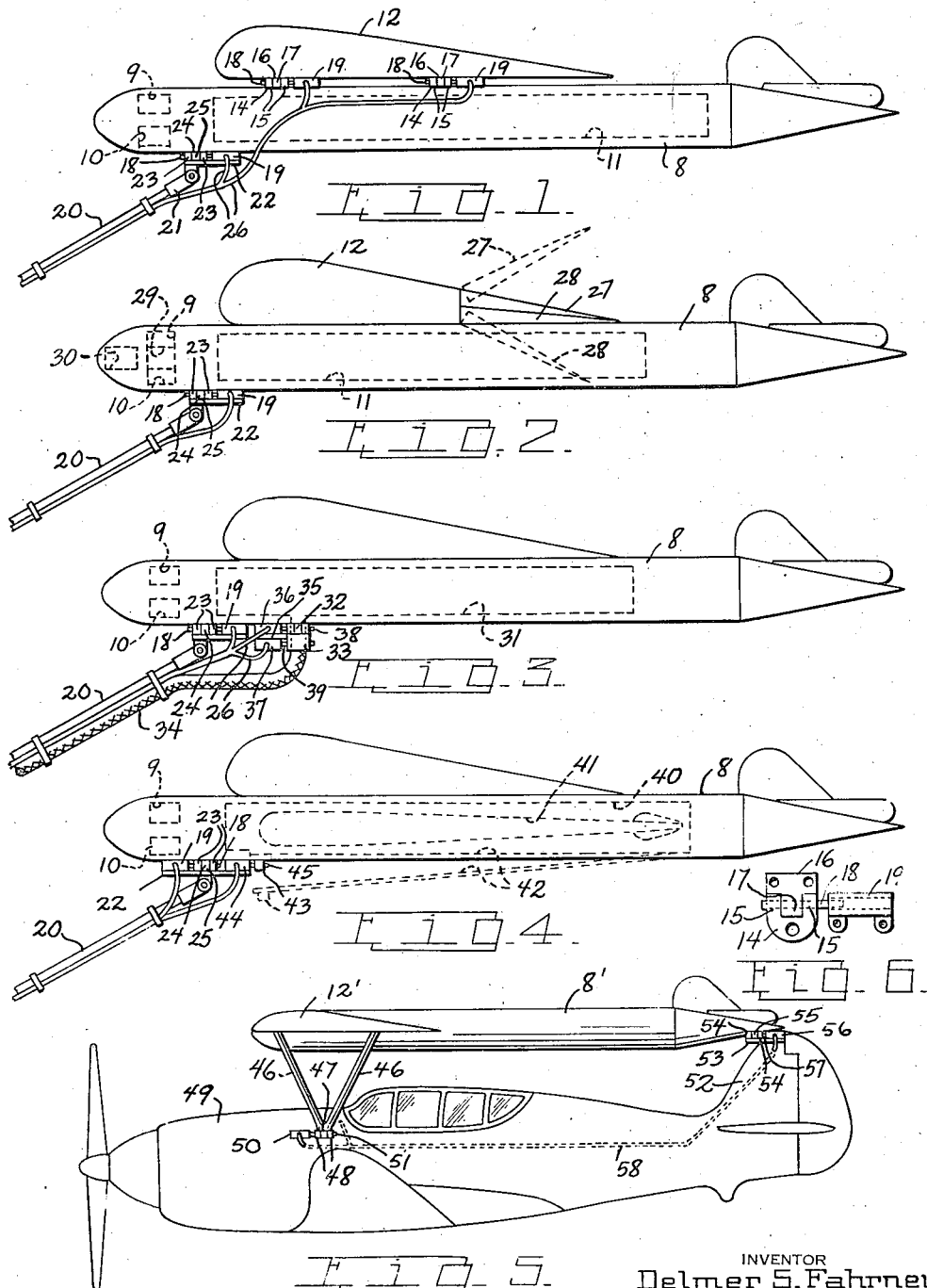

2,399,215

UNITED STATES PATENT OFFICE 2,399,215

GLIDER

Delmer S. Fahrney, United States Navy
Chevy Chase, Md.

Application August 16, 1941, Serial No. 407,140

4 Claims. (Cl. 244—3)

(Granted under the act of March 3, 1883, as
amended April 30, 1928; 370 O. G. 757)

The present invention relates to a glider adapted to be towed or carried by an airplane, the fuselage being formed of any suitable light weight material and of any desired configuration. The wing and control surfaces being of conventional design.

It is an object of the present invention to provide the fuselage with compartments that house radio control equipment, servo motors, batteries, stabilizers, auxiliary fuel tank, bomb, torpedo, flare and smoke screen material.

A still further object of the present invention is the provision for pilotless towing of a glider through use of stabilizers and servo mechanism to actuate the control surfaces of the glider automatically.

A still further object of the present invention is the provision of detachable means on the fuselage operable by release mechanism controlled from the towing airplane.

A still further object of the present invention is the provision of releasable means connecting the airplane and glider, also controlled from the towing airplane.

A still further object of the present invention is the provision of means controlled from the towing airplane for releasing material from some of the compartments in the fuselage of the glider.

Other objects and advantages of the present invention will be more apparent from the following description and claims.

Referring now to the accompanying drawing which is made a part hereof, and on which similar reference characters indicate similar parts throughout the several views.

Figure 1 is a side elevational view of the glider fuselage and detachable wing. The servo motor, stabilizer, battery and bomb compartments being shown in dotted lines in the fuselage, and a tow line and cables being shown fragmentarily and connected to conventionally illustrated release means.

Figure 2 is a view similar to Figure 1, the wing being provided with adjustable diving flaps, the glider fuselage with a television or radio mechanism compartment shown in dotted lines, and with a tow line and cables shown fragmentarily and connected to conventionally illustrated release means.

Figure 3 is a view similar to Figure 1, the wing in the drawing being fixedly secured to the fuselage, the fuselage provided with a fuel compartment shown in dotted lines and a fuel supply conduit connected to a valve in said compartment, the tow line, cables and fuel supply conduit being shown fragmentarily and connected to release means shown conventionally.

Figure 4 is a view similar to Figure 3, the fuselage being provided with a compartment and a hinged door, a bomb or torpedo in said compartment; the compartment door and bomb or torpedo being shown in dotted lines, the tow line and cables being shown fragmentarily and connected to release means shown conventionally.

Figure 5 is a side elevational view of a modified form of the present invention in which the glider is secured to release means on the airplane, the fuselage of the glider being provided with compartments shown in dotted lines, a fuel supply conduit connected to a valve in said compartment, means for opening the valve and means for releasing the conduit being shown conventionally.

Figure 6 is a plan view of a type of hinge for connecting a plate and a wing to the fuselage and illustrating the connecting pin and solenoid.

Referring now to the drawing, the fuselage or body 8 of the glider may be made of any suitable light weight material, such as metal, plastic or the like, the fuselage being formed in any desired configuration. As illustrated in the drawing, the fuselage 8 is provided with a plurality of compartments, the numeral 9 representing the electric or hydraulic servo and stabilizer compartment, 10 the battery compartment and 11 the compartment for high explosives.

In Figure 1, the fuselage 8 is provided with a wing 12 that is detachably secured to the body in the following manner. On the fuselage 8 are mounted plate members 14 that are bolted or otherwise secured to the fuselage, the members being provided with spaced knuckles 15. On the wing 12 are mounted plate members 16 that are bolted or otherwise secured to the wing, the members being provided with knuckles 17 that engage the knuckles 15. The plates are detachably connected by a pin 18, that passes through the sets of knuckles. One end of the pin 18 is connected to means adapted to uncouple the plates and in the present showing, I have illustrated one form of uncoupling means in the form of a solenoid 19 for operating the pin 18. Solenoids being of well known types and well known in the art, I have not shown them in detail. I would, at this point have it distinctly understood that although I have shown a solenoid, I do not wish to limit myself to same as other types of release means may be employed. A tow line 20 connects the glider to an airplane (not shown), one end of the tow line being provided with a clevis 21 operatively secured to a plate support 22 that carries knuckles 23 and a solenoid 19. Secured to the fuselage 8 in any suitable manner is plate 24 having a knuckle 25 that engages knuckles 23, the plates being held in detachable engagement by pin 18, one end of the pin being connected to solenoid 19. The tow line 20, carries a plurality of electric cables 26 that connect solenoids 19 to a source of electrical energy in an airplane (not shown).

In Figure 2 of the drawing, the wing 12 is shown as being fixedly secured to the body 8 and it is provided with adjustable diving flaps 27 and 28 which can be set automatically on release of glider. In the nose of the fuselage 8 in compartment 29 is housed radio control equipment, in compartment 9 is housed an electric or hydraulic servo and stabilizer, in compartment 10 battery and in compartment 30 television or radio equipment, all of the equipment being well known in the art, it is not shown in detail. The fuselage is provided with the tow line release mechanism illustrated in Figure 1.

In Figure 3, in the nose of the fuselage 8 in compartment 9 is an electric or hydraulic servo and stabilizer and in compartment 10 a battery. Within the fuselage 8 is a fuel compartment 31 having an outlet valve 32 equipped with a coupling nipple 33 that engages the end of a fuel hose 34, the fuel hose being carried by the tow line 20. The fuselage 8 carries a plate 35 that may be detachably secured to the fuselage, the plate carrying a pair of solenoids 36 and 37. Connected to the solenoids 36 and 37 are electric cables 26 that are carried by the tow line 20. Pin 38 of solenoid 36 engages the valve 32 while pin 39 of solenoid 37 engages the coupling nipple 33. The tow line release mechanism is the same as illustrated in Figure 1.

In Figure 4 of the drawing, the compartment 40 is adapted to house a bomb, or as illustrated, torpedo 41 shown in dotted lines. The compartment 40 is provided with a trap door 42 that is provided with a catch lug 43. The plate support 22 in this view is somewhat longer and allows for the mounting of an additional solenoid 44 having an engaging pin 45. The pin 45 engages the catch lug 43 and holds the trap door 42 in locked position. Although I have shown in Figure 4 an aerial torpedo 41 in compartment 40 I would have it distinctly understood that the compartment may be utilized for housing flare or smoke screen material.

In Figure 5, I have illustrated a modified form of my invention in which the glider is detachably mounted on an airplane. The fuselage 8' is provided with a plurality of compartments previously described, and therefore no further description is deemed necessary. To the wings 12' are secured struts 46 having a knuckle 47 that engages knuckles 48. Mounted on the fuselage 49 is a solenoid 50 having a pin 51 that engages the knuckles 47 and 48. On the vertical stabilizer 52 there is mounted a plate 53 that is provided with knuckles 54 that are engaged by knuckle 55 carried by the fuselage 8'. The plate 53 also carries a solenoid 56 having a pin 57 that engages the knuckles 54 and 55. An electric conduit 58 connects the solenoids with a source of electrical energy within the fuselage 49.

In the use of the glider illustrated in Figure 1 the glider is towed to a target at which point the pilot of the airplane towing the glider presses a button or switch making contact with a source of electrical energy, the electrical energy passing through the conduits 26 to the solenoids 19 thus energizing the solenoids withdrawing the pins from the knuckles thus releasing the wing, the tow line and the electrical cables. Upon release of the wing, electrical cables and tow line, the fuselage carrying the bomb falls free onto the target.

In the glider illustrated in Figure 2, the glider is towed to an objective, the glider in this view having the wing fixedly secured to the fuselage. The diving flaps 27 and 28 are set at a predetermined angle. Through energization of a solenoid 19 from the source of electrical energy in the towing airplane the tow cable and electrical cables are released from the fuselage. The equipment 30 (television or radio detectors) directs the released glider bomb to its objective, the radio, servomotors, stabilizers and television being supplied with current from the battery source. The control pilot in the tow plane through the radio equipment actuating appropriate relays actuates servo mechanism in the glider bomber directs it toward target as indicated by radio or television equipment until the glider bomber strikes its objective.

In the use of the glider illustrated in Figure 3, the glider serves as an auxiliary fuel tank. The fuel is released from the tank 31 by the energization of the solenoid 36 withdrawing the pin 38, the gasoline passing from the tank or compartment 31 through the fuel hose 34 to the fuel tank in the towing airplane. When the compartment 31 is empty the glider can be released or towed back to base station. To release, the pilot presses a switch connecting the source of electrical energy with the solenoids thus releasing from the glider the tow line 20, the electric conduits 26 and the fuel hose 34, the glider will glide to a landing on field or water through the medium of the operation of glider controls by servo mechanism and stabilizers.

In the use of the glider illustrated in Figure 4, the compartment 40 being loaded with a bomb or torpedo, the glider is towed to an objective at which point the pilot of the towing airplane throws a switch, the electric current passing through the cable 26 energizes the solenoid withdrawing the pin from the trap door catch lug 43, the door opening and releasing the bomb or torpedo simultaneously with the energization of solenoid 44. The glider can then be returned to base and released by energization of solenoid 19. The glider is freed from the tow line 20 and the electric cables 26 and glides to a landing through actuation of control surfaces by servo and stabilizers energized by a battery.

The modification of my invention illustrated in Figure 5, the glider being detachably secured to the airplane is carried to the desired objective at which point energization of the solenoids 50 and 56, the pins 51 and 57 are withdrawn from the knuckles, releasing the glider. This glider is primarily designed to carry additional fuel in its fuselage to increase materially the range of the airplane supporting it. The glider's wing being of ample proportions to lift the additional weight.

Other modifications and changes in the proportions and arrangement of the parts constituting the invention may be made by those skilled in the art without departing from the nature and scope of the invention, as defined in the appending claims.

The invention described herein may be manufactured and used by or for the Government of the United States of America for governmental purposes without the payment of any royalties therein or therefor.

What I claim is:

1. In combination with an airplane a glider having a fuselage and a wing, plate members having knuckles secured to said fuselage and wings, a detachable plate member having knuckles and a solenoid, a tow line having a clevis fixedly secured to said detachable plate member, said detachable plate solenoid connecting said plate to one of said plates on said fuselage, solenoids carried by said wing and connecting the plate members carried by said wing to other plate members carried by said fuselage.

2. In combination with an airplane a glider having a fuselage and a wing, plate members having knuckles secured to said fuselage and wings, a detachable plate member having knuckles and a solenoid, a tow line having a clevis and fixedly secured to said detachable plate member, said detachable plate solenoid connecting said plate to one of said plates on said fuselage, solenoids carried by said wing connecting the plate members carried by said wing to other plate members carried by said fuselage, electrical supply means carrier by said airplane, an electrical conduit carried by said tow line and connecting said electrical energy supply means to said solenoids for releasing the detachable plate and said wing.

3. In combination with an airplane a glider having a fuselage and a wing, plate members secured to said fuselage and to said wing, said plate members having connecting means, solenoids carried by said fuselage and wing, a tow line connecting said airplane with said fuselage, said tow line at one end having a plate member that is provided with a connecting means adapted for engagement with the plate carried by said fuselage, said tow line supporting a conduit, said conduit having members connecting said solenoids with a source of electrical energy in said airplane, whereby energization of said solenoids releases said wings and towing cable from said fuselage.

4. In combination with an airplane a glider having a fuselage, compartments in said fuselage, an opening in one of said compartments, closure means for said opening, said closure means having a catch lug, plate members having connecting means secured to said fuselage, detachable plate members having engaging means and a solenoid, a tow line connected to said detachable plate members, said detachable plate solenoid connecting said plate to said plate members on said fuselage and to said catch lug on said closure means, electrical supply means carried by said airplane, an electrical conduit carried by said tow line and connecting said electrical energy supply means to said solenoids for releasing the detachable plate whereby the closure means swings open.

DELMER S. FAHRNEY.